July 2, 1940.    R. S. DRUMMOND    2,206,770
SURFACE SHAVING
Filed Dec. 19, 1938
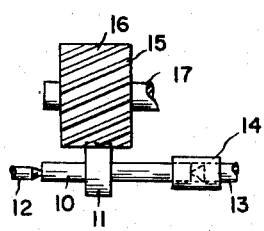
FIG.1.
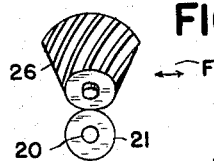
FIG.2A.
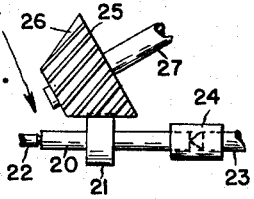
FIG.2.
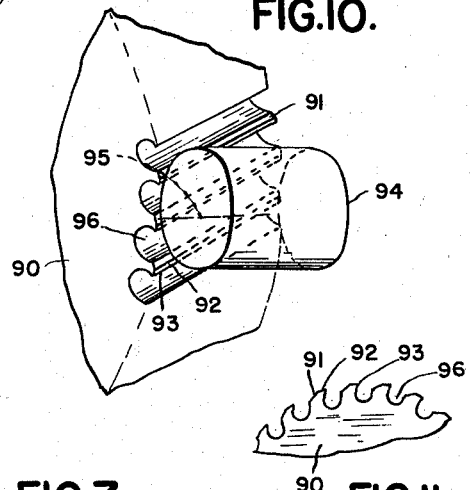
FIG.10.
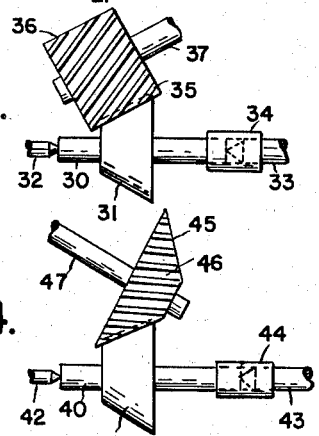
FIG.3.
FIG.4.
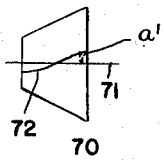
FIG.7.
FIG.11.
FIG.5.
FIG.9.
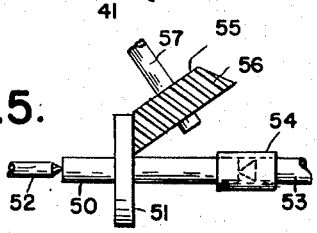
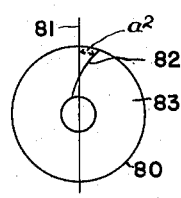
FIG.8.
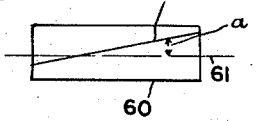
FIG.6.
INVENTOR
ROBERT S. DRUMMOND
BY Whittemore, Hulbert & Belknap
ATTORNEYS Patented July 2, 1940

2,206,770

UNITED STATES PATENT OFFICE 2,206,770

SURFACE SHAVING

Robert S. Drummond, Detroit, Mich., assignor to National Broach & Machine Company, Detroit, Mich., a corporation of Michigan Application December 19, 1938, Serial No. 246,749

25 Claims. (Cl. 90—11)

The present invention relates to a new method of metal cutting herein referred to as the shaving of metal surfaces of revolution.

It is an object of the present invention to shave surfaces of revolution by simultaneously rotating a work piece and a shaving cutter.

It is a further object of the present invention to finish surfaces of revolution by taking cuts at high speed and at a small angle to the plane passing through the axis of the work.

It is a further object of the present invention to correlate helix angle of the cutter, pitch of the cutter, surface speed of the cutter and work and rate of relative feed, so as to remove metal from the work piece in a plurality of fine overlapping cuts.

It is a further object of the present invention to finish surfaces of revolution with a rotary conical cutter.

It is a further object of the present invention to finish surfaces of revolution with a rotary cutter having narrow lands or unrelieved portions back of the cutting edge.

It is a further object of the present invention to finish surfaces of revolution by rotating the work piece at relatively high speed, rotating a shaving tool having inclined cutting edges in line contact with the work piece, the tool having narrow unrelieved portions back of the cutting edge, the rates of rotation of the work piece and tool being related such that each cutting edge cuts at a small angle to the plane passing through the axis of the work piece, relatively feeding the tool and work piece during rotation, decreasing the rate of feed near depth, interrupting feed at finish depth to completely finish the work piece to predetermined dimensions and separating the tool and work piece.

Other objects of the invention will be apparent as the description proceeds and when taken in conjunction with the accompanying drawing, and wherein:

Figs. 1 to 5 are diagrammatic views illustrating the association between the work piece and the cutter;

Fig. 6 is a diagrammatic view illustrating the cut taken from a cylindrical work piece;

Fig. 7 is a diagrammatic view illustrating a typical cut taken from a conical work piece;

Fig. 8 is a diagrammatic view illustrating a typical cut taken from a radial surface of the work piece;

Fig. 9 is a diagram illustrating the method of computing the angle of cut;

Fig. 10 is a fragmentary perspective showing the association between a cylindrical work piece and a conical cutter; and Fig. 11 is a fragmentary section through a portion of a shaving cutter.

The present invention relates to a novel method of cutting. The method may be carried out by a wide variety of machines as will be evident, and I do not consider it necessary to illustrate a machine for carrying out the method. A machine well adapted to carry out my method however is disclosed in my copending application, Serial Number 168,509, "Machine for finishing surfaces," filed October 11, 1937.

The present method is a method for finishing surfaces of revolution to a high degree of accuracy and is to be sharply distinguished from conventional milling and turning practices.

Briefly described, the present method is as follows: A work piece having a surface of revolution to be finished is mounted for rotation and is driven at a relatively high speed, this speed being substantially above what is recognized in the art as feeding speeds. A cutter is provided, preferably of conical shape but optionally cylindrical or formed to correspond to a desired contour. This cutter has a plurality of cutting edges which are inclined. In the case of a cylindrical cutter these cutting edges are arranged helically, and are correspondingly arranged on conical and formed cutters. The cutters employed in the present invention are preferably of relatively fine pitch and are further characterized by the provision of a narrow land or unrelieved portion directly back of the cutting edge. The cutter is brought into contact with the work piece, preferably with the axis of the work piece and the axis of the cutter lying in the same plane. If desired however, initial contact may be with the axes non-coplanar, and subsequent feed may be or have a component substantially radial to the work surface. This will result in the establishment of line contact between the cutter and the work piece. Due to the inclination of teeth on the cutter the cutting edges will be at an angle to and will cross the line of contact. The cutter is rotated at relatively high speeds, preferably at speeds in excess of conventional milling speeds. For example, according to ordinary practices, cutting is more frequently done with the cutting speeds in the neighborhood of 60 to 80 feet per minute. According to the present invention cutting speeds of 100 feet per minute and extending thereabove are employed.

While the tool and the work piece are rotating in contact they are fed relatively of each other so as to cause the cutter to be fed into the work piece. This relative feeding motion may take place in a manner which may well be described as a plunge cut. The rate of feed is preferably such that substantially overlapping cuts are produced. Preferably as the tool approaches finish depth the rate of feed is decreased so that finer chips are removed near depth. At final depth relative feed is interrupted and rotation continues for a short interval in order to completely finish the surface of a work piece.

The same method may be practiced with the modified feed, as will now be described. Instead of relatively feeding the tool and work piece so that their axes approach directly, or such that their axes approach while remaining in the same plane, it is possible to relatively feed the cutter and the work piece such that the feed is tangential. By this method one of the members, for example the tool, may be fed in a direction tangential to the surface of the work piece. This feed may be, and preferably is, reduced in rate as the tool approaches depth, and also as in the above described feeding step, the feed is interrupted at depth to provide a substantial dwell.

This last mentioned type of feed, which may be described as tangential, is particularly useful in certain instances, when due to space limitation the oblique substantially radial plunge cut is not possible.

It has been found that the character of the finish imparted to the work piece is effected to a surprising degree by the angle at which metal is removed from the work piece. This angle, as will be readily apparent, depends upon the surface speed of the cutter, the surface speed of the work and the angle of inclination of the cutting teeth.

In the present application I shall refer to this angle as the angle of cut. By the angle of cut I mean the angle between the path of removal of metal by a single cutting edge and a plane passing through the axis of the work. The angle of cut is directly measured by the angle between the line of contact on the work surface, and the path of removal of metal therefrom.

With this in mind it will be appreciated that increased surface speed of the cutter results in a decreased angle of cut. Increased surface speed of the work piece results in increased angle of cut, and other conditions remaining constant the angle of cut is greater for larger angles of inclination of the cutter teeth.

With the foregoing somewhat general description in mind, I shall now proceed to set forth my particular invention with a degree of particularity which will enable those skilled in the art to practice the same.

I have made a great number of tests and I find that best results are obtained when the several variables are within certain well defined limits, and optimum results are obtainable at certain values of said variables within said limits.

Experiments have demonstrated that the superior finish and accuracy which characterizes the instant method is most apparent when the angle of cut, as above defined, is between the limits of 30' (thirty minutes) and 20°. I may say that results are improved with smaller angles, and I have found that with an agle of cut in the neighborhood of 1° 30', the best results are obtained. However, in practice, good results are obtained up to 40°, although I prefer to limit the angle of cut to less than 5°.

In arriving at this most desirable angle of cut, I have fully investigated the controlling variables. I have further discovered that the ratio between surface speed of the cutter to mean surface speed of the work should preferably be in the vicinity of ten to one (10–1), although good results follow employment of ratios between 5– and 20–1.

As will be apparent, the angle of cut is determined by the ratio of surface speeds just referred to, but it also is dependent on the helix angle or angle of inclination of the cutting edges of the cutter. This angle will preferably be selected between 3° and 30°, and excellent results are obtained with cutting edges inclined about 20–25°.

The considerations just recited determine the angle of cut, but as will be evident, results will also be affected by the actual surface speed of both cutter and work, which together determine the cutting speed or the speed at which the cutting edges move through the metal. These speeds must be varied for different metals, as will be understood, higher speeds being employed on softer metals. For 4640 steel, the following speeds are found suitable. The cutter may be turned to result in a surface speed from between 150 to 450 feet per minute, with best results appearing at a cutter speed of about 300 to 350 feet per minute. In like manner, the work piece should be turned to cause a substantial surface speed thereof, between 7½ and 90 feet per minute, and preferably about 30 feet per minute. As will be apparent, this results in an optimum actual cutting speed (assuming a conventional cut) of about 300 to 400 feet a minute.

Another factor which enters into the efficiency of the operation is the pitch of the cutter teeth. This pitch should be small, normally less than ¼" pitch at the small end of the cutters, if tapered, and about the same if cylindrical.

It is further necessary to correlate the rate of cut or the feed of the tool into the work, since this, together with the pitch of the cutter and surface speed ratio of cutter and work determine the amount by which adjacent cuts overlap. This feed will necessarily vary for different set-ups, and may be such as to effect a substantial overlap of adjacent cuts, and preferably such that alternate cuts overlap.

As mentioned above, speeds are in part dependent on the material worked with, and will be reduced for high nickel or other extremely tough steels and correspondingly increased for brass, aluminum and the like.

In Fig. 1 I have illustrated a set-up for shaving a cylindrical surface of revolution with a cylindrical tool. In this case a work piece 10 having a cylindrical surface of revolution 11 is mounted between spindles 12 and 13. I have indicated a driving connection between the spindle 13 and the work piece 14. A cutter 15 having helically extending teeth or cutting edges 16 is rotatably supported on a spindle 17. In the present instance it is immaterial whether cutting teeth 16 are arranged in a right or left-hand spiral. The work piece 10 and the cutter 15 are both rotated at relatively high speeds, the speed being proportioned such that each tooth 16 removes metal from the surface 11 at a small angle of cut.

In Fig. 2 I have illustrated a similar set-up for finishing a cylindrical surface of revolution employing however in this instance a conical cutter. A work piece 20 having a cylindrical surface of revolution 21 is supported between centers 22 and 23 and is connected to driving center 23 by driving connection 24. The conical cutter 25, provided with inclined cutting edges or teeth 26, is driven by spindle 27. In this case the spindle 27 is inclined at an angle to the axis of the work piece such that the surface of the conical cutter 25 makes line contact with the surface 21.

It will also be appreciated that the line of contact between the tool and the work piece is coplanar with their axes. In the present instance it is preferred to provide cutting edges or teeth of such hand so that the cutting action of each tooth is initiated near the small end of the cutter. This has the effect of forming chips toward the large end of the cutter which materially facilitates disposal of chips. As in the former case, and as in all cases herein described, the speeds of rotation of the work piece and cutter are such that the angle of cut is relatively small and at the same time the cutting speed is relatively high.

In Fig. 3 I have illustrated a set-up for shaving the conical surface with a cylindrical cutter. In this case the work piece 30 having a conical surface of revolution 31 is supported between centers 32 and 33, driving center 33 being operatively connected to the work piece with a driving connection 34. The tool 35, which in this instance is cylindrical, is provided with inclined cutting teeth or edges 36 and is driven from spindle 37. Again the relative speeds of rotation are such that the angle of cut is small and the cutting speed is relatively high.

In Fig. 4 I have illustrated a set-up for finishing a conical surface of revolution by means of a conical cutter. In this case the work piece 40 having a conical surface 41 is supported between centers 42 and 43, the driving center 43 being operatively connected to the work piece by means of a driving fixture 44. The cutter 45 having inclined teeth or edges 46 is driven from a spindle 47.

A somewhat different set-up is illustrated in Fig. 5 in which the work piece 50 having a flat radially extending surface of revolution 51 is supported between centers 52 and 53, the driving center 53 being operatively connected to the work piece by means of a driving fixture 54. The conical cutter 55 having inclined cutting teeth or edges 56 is driven from the spindle 57. In this case as in all of the preceding cases the axis of the work piece and the axis of the cutter may be coplanar, and the cutter may contact the surface to be finished in a line contact which is also coplanar with the axes of the cutter and the work piece. If preferred a tangential feed may be employed.

As suggested at the outset, while the tool and work piece are being rotated a relative feeding motion takes place. The tool and work piece are relatively fed in a direction to cause the tool to cut into the work piece. Rotation of the work piece results in the distribution of the cutting action around the work piece during the feeding motion. As will be appreciated, this feeding motion may result from feeding the tool or the work piece, or both.

The direction of feed may, in some instances be perpendicular to the surface of the work piece or may be inclined from the perpendicular in the direction of the axis of the work, or inclined laterally thereto.

Generally speaking, however, it is desirable to provide relative feed between the tool and the work piece in a direction such that the tool is not fed directly toward the surface of the work piece. It is found preferable to feed the tool obliquely at a substantial angle. This oblique relative feeding motion results in a more finely controlled feed, since only a portion of the total travel is effective to increase the depth of cut. Feeding motion oblique to the surface being cut further serves to distribute the cutting action to some extent over the face of the cutter. In addition it appears to influence in a beneficial manner the nature of the cutting action.

According to the present invention the relative feed may also be in a direction substantially tangential to the surface of the work piece.

Thus for example in Fig. 2 the direction of feed of the tool may be in the direction of the arrow F. If preferred, or if rendered necessary by reason of space limitations, it may be in Fig. 2 in the plane tangent to both tool and work, one such direction indicated in Fig. 2A by the arrow F". In the last case, it will be appreciated that predetermined tool depth is preferably reached when the axes become coplanar so that further feeding would cause a separation of tool and work piece. This however, is not necessary since the feed of tool 26 in Fig. 2A may be interrupted before its axis becomes coplanar with the axis of the work piece 20.

In Fig. 6 I have illustrated at $a$ the angle of cut on a cylindrical work piece 60. In this figure I have indicated the line of contact between the tool and the work piece at 61. Since, as previously described, the axis of the tool and work piece may be coplanar, it will be appreciated that the line of contact 61 between the tool and work piece is coplanar with said axis, and in this instance parallel to the axis of the work piece. The path of removal of metal, that is, the portion of the work piece from which a single tooth removes metal, is indicated at 62 and at $a$ I have indicated the angle of cut resulting.

Fig. 7 is similar to Fig. 6 and illustrates the angle of cut on a conical work piece. In this case 72 indicates the cut of a single cutting tooth or the path of removal of metal. The line of contact between the tool and work piece is indicated at 71. The resulting angle of cut is indicated at $a^1$. In the present instance the line of contact 71 is coplanar with the axis of the work piece and cutter.

In Fig. 8 I have illustrated the angle of cut on a work piece 80 having a radial flat surface of revolution 83 such as diagrammatically illustrated in Fig. 5. In the present instance the line of contact between the tool and the work is indicated at 81. This line of contact is coplanar with the axes of the work piece and tool and lies in a plane passing through the axis of the work piece. The cut taken by a single tooth of the cutting tool is indicated at 82 and the resulting angle of cut is indicated at $a^2$.

Preferably the direction of rotation of the work piece and tool is such that a conventional cut is taken, although it is contemplated that under certain circumstances a climb cut may be employed.

I have illustrated in Fig. 9 a figure showing the relationship between surface speeds of the tool and work piece, helix angle of the tool and the angle of cut on the work piece. In this figure the triangle ABC is constructed in which the angle H is equal to the helix angle of the cutter and the side $S_t$ represents the surface speed of the tool. The line AD, or AD', is constructed perpendicular to the base AC, representing a conventional and climb cut, respectively. The distance AD, or AD', represents the surface speed $S_w$ of the work in the same units as the line BC represents the surface speed $S_t$ of the tool. The line DC, or D'C, is then drawn and the angle $a$, or $a'$, represents the angle of cut.

A consideration of Fig. 9 shows that the following relationship holds:

$$\tan a = \frac{Sw \tan H}{S_t}$$

It will be observed that this relationship holds whether the work piece is rotated in a direction to give a conventional cut or whether the work piece is rotated in a direction to give a climb cut.

In Fig. 10 I have illustrated a conical cutter 90 having a plurality of finely pitched cutting teeth 91. The teeth 91 preferably are provided with a narrow unrelieved portion or land 92 immediately back of the cutting edge 93. A work piece 94 in this instance is illustrated as a cylinder and the contact between the work piece 94 and the tool 90 will be in line contact along the line 95. As well illustrated in this figure the cutting edges 93 cross the line of contact.

In Fig. 11 I have illustrated a fragmentary elevation of the cutter 90 in which the teeth 91 are shown as provided with unrelieved portions or lands 92 immediately back of cutting edge 93. As will be understood, the teeth 91 are provided with suitable rake angles and teeth spaces 96 to provide for chip disposal.

The present method of finishing metal by a shaving process results in the formation of chips which are extremely fine and which as they come from the machine are coiled into a cylinder. As is well understood, the form of chips is an indication of the nature of the cutting action. I have observed that in my surface shaving, the chips are loosely coiled or twisted in helical form, and define a cylinder. In typical set-ups I have observed that the chips obtained may define cylinders on the order of .020 or less inch in diameter. It will be appreciated that chips of this type are entirely dissimilar from chips previously obtained in conventional milling or turning practices.

While I have indicated that the present method of surface shaving may be employed with cylindrical cutters, I prefer to employ conical cutters, particularly on cylindrical surfaces of revolution.

As suggested above the cutting speed employed is substantially higher and may in fact be several times as high as the cutting speed in conventional milling.

By employing a conical cutter and by arranging the teeth such that each tooth initiates its cutting action adjacent the small end of the cutter an improved cutting action results. This is due to at least two different considerations. In the first place, by initiating the cutting action adjacent the small end of the cutter, the chips are formed towards the large end of the cutter. At the large end of the cutter the space between adjacent teeth increases with the result that increased space for chip clearance is provided. At the same time it will be appreciated that the surface speed of a tooth is substantially smaller adjacent the small end of the conical cutter. By arranging the teeth so as to initiate their cutting action adjacent the small end of the cutter, I provide that the teeth will come into contact with the surface being shaved at a substantially lower linear velocity. This results in minimizing the possibility of damage to the cutter and at the same time results in a better cutting action. As will be readily apparent, the cut of each tooth is begun at a relatively slower speed and as the cut progresses from end to end of the tooth the cutting speed increases, thus tending to throw the chips off the cutter.

I have referred above to the fact that preferably the cutting teeth are unrelieved for a slight distance directly in back of the cutting edge. The amount of this unrelieved portion is preferably from .002 to .010 inch. This unrelieved portion appears to materially enhance the final finish of the work piece.

It will be appreciated that the present method is a method of finishing or finish shaving and is to be sharply distinguished from methods employed in removing large amounts of metal. Results obtained by a practice of the present method compare favorably with finish grinding, and in many cases my surface shaving operation may be the final finishing operation for bearing parts. In the event that an even more accurate finish is desired, it will be appreciated that a shaved surface may be finish ground much more quickly and economically than cut surfaces previously known to the art. I have found that surfaces of revolution by my improved process may be finished to an accuracy within a limit of .001 inch or less.

In general, I find that the accuracy and finish of the work is dependent in large part on the angle of cut. The relative feed contributes to the result, but excellent results may be obtained whether the feed is radial or oblique to the axis of the work; perpendicular to the work surface; or oblique to said surface, either inclined from the perpendicular in the plane of the work axis or oblique thereto; or tangential to the work surface, either perpendicular to the axis of the work or oblique thereto.

The foregoing detailed description has been given for clearance and understanding only, and no unnecessary limitation should be understood therefrom, but the appended claims should be construed as broadly as permissible in view of the prior art.

What I claim as my invention is:

1. The method of shaving a surface of revolution of a work piece with a rotary cutter having blades inclined at an angle of less than 30°, the tops of the blades of the cutter being unrelieved so as to provide a narrow land back of the cutting edge, the cutter having a circular pitch not substantially greater than .250 inch, which comprises: line contacting said cutter and said surface; rotating said cutter and work piece simultaneously at substantial speeds; relating said speeds to provide a limited angle of cut; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

2. The method of shaving a surface of revolution of a work piece with a rotary conical cutter having blades inclined at an angle of less than 30°, the blades of the cutter being unrelieved so as to provide a narrow land back of the cutting edge, the cutter having a circular pitch not substantially greater than .250 inch, which comprises: line contacting said cutter and said surface; rotating said cutter and work piece simultaneously at substantial speeds; relating said speeds to provide a limited angle of cut; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

3. The method of shaving a surface of revolution of a work piece with a rotary cutter having blades inclined at an angle of less than 30°, the blades of the cutter being unrelieved so as to provide a narrow land back of the cutting edge, the cutter having a circular pitch not substantially greater than .250 inch, which comprises: line contacting said cutter and said surface; rotating said cutter and work piece simultaneously at speeds such that the relative surface speed is greater than 200 feet per minute; relating said speeds to provide an angle of cut of less than 5°; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

4. The method of shaving a surface of revolution of a work piece with a rotary cutter having blades inclined at an angle of less than 30°, the blades of the cutter being unrelieved so as to provide a narrow land back of the cutting edge, the cutter having a circular pitch not substantially greater than .250 inch, which comprises: line contacting said cutter and said surface; rotating said cutter and work piece simultaneously at substantial speeds; relating said speeds to provide a limited angle of cut; relatively feeding said cutter and work piece in plunge cutting relation at a rate designed to cause alternate cuts to overlap; reducing the rate of feed near depth; interrupting the feed to provide a dwell at depth; and separating said cutter and work piece.

5. The method of shaving a surface of revolution of a work piece with a rotary cutter having blades inclined at an angle of less than 30°, which comprises: line contacting said cutter and said surface; rotating said cutter and work piece simultaneously at substantial speeds; relating said speeds to provide a limited angle of cut; relatively feeding said cutter and work piece in plunge cutting relation at a rate designed to cause adjacent cuts to overlap substantially; reducing the rate of feed near depth; and interrupting said relative feed at depth.

6. The method of shaving a surface of revolution of a work piece with a rotary cutter having blades inclined at an angle of less than 30°, which comprises: line contacting said cutter and said surface; rotating said cutter and work piece simultaneously at substantial speeds; relating said speeds such that the angle of cut is less than 5°; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

7. The method of shaving a surface of revolution of a work piece with a rotary cutter having blades inclined at an angle of less than 30°, which comprises: line contacting said cutter and said surface; rotating said cutter and work piece simultaneously at speeds such that the relative surface speed is in the vicinity of 300 to 400 feet per minute; relating said speeds to provide a limited angle of cut; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

8. The method of shaving a surface of revolution of a work piece with a rotary cutter having blades inclined at an angle of less than 30°, the blades of the cutter being unrelieved so as to provide a narrow land back of the cutting edge, line contacting said cutter and said surface; rotating said cutter and work piece simultaneously at substantial speeds; relating said speeds to provide a limited angle of cut; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

9. The method of shaving a surface of revolution of a work piece with a rotary cutter having blades inclined at an angle of less than 30°, the blades of the cutter being unrelieved so as to provide a narrow land back of the cutting edge, line contacting said cutter and said surface; rotating said cutter and work piece simultaneously at speeds such that the relative surface speed is greater than 200 feet per minute; relating said speeds to provide an angle of cut of less than 5°; relatively feeding said cutter and work piece in plunge cutting relation at a rate designed to cause adjacent cuts to overlap substantially, reducing the rate of feed near depth; interrupting the feed to provide a dwell at depth; and separating said cutter and work piece.

10. The method of shaving a surface of revolution of a work piece with a rotary cutter having blades inclined at an angle of less than 30°, the blades of the cutter being unrelieved so as to provide a narrow land back of the cutting edge, line contacting said cutter and said surface; rotating said cutter and work piece simultaneously at speeds such that the relative surface speed is in the vicinity of 300 to 400 feet per minute; relating said speeds to provide a limited angle of cut; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

11. The method of shaving a surface of revolution of a work piece with a rotary cutter having blades inclined at an angle of less than 30°, which comprises: line contacting said cutter and said surface; rotating said cutter and work piece simultaneously, the cutter speed being such as to produce a surface speed of about 300 to 350 feet per minute, the work speed being such as to produce a surface speed of about 30 feet per minute; relating said speeds such that the angle of cut is less than 5°; relatively feeding said cutter and work piece in plunger cutting relation.

12. The method of shaving a surface of revolution of a work piece with a rotary cutter having blades inclined at an angle of less than 30°, which comprises: line contacting said cutter and said surface; rotating said cutter and work piece simultaneously at speeds such that the relative surface speed is in the vicinity of 300 to 400 feet per minute; relating said speeds such that the angle of cut is less than 5°; relatively feeding said cutter and work piece in plunge cutting relation.

13. The method of shaving a surface of revolution of a work piece with a rotary cutter having blades inclined at an angle of less than 30°, which comprises: line contacting said cutter and said surface; rotating said cutter at a surface speed of between 200 to 400 feet per minute; rotating said work at a substantially less speed such that the angle of cut is less than 5°; relatively feeding said cutter and work piece at a rate designed to cause adjacent cuts to overlap substantially, reducing the rate of feed near depth; interrupting the feed to provide a dwell at depth; and separating said cutter and work piece.

14. The method of shaving a surface of revolution of a work piece with a rotary cutter having blades inclined at an angle of less than 30°, the blades of the cutter being unrelieved so as to provide a narrow land back of the cutting edge, which comprises: line contacting said cutter and said surface; rotating said cutter and work piece simultaneously at substantial speeds; relating said speeds such that the line of cut approaches parallelism with the line of contact; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

15. The method of shaving a surface of revolution of a work piece with a rotary conical cutter having blades inclined at an angle of less than 30°, the blades of the cutter being unrelieved so as to provide a narrow land back of the cutting edge, which comprises: line contacting said cutter and said surface; rotating said cutter and work piece simultaneously at substantial speeds; relating said speeds such that the line of cut approaches parallelism with the line of contact; relatively feeding said cutter and work piece in plunge cutting relation at a rate designed to cause adjacent cuts to overlap substantially; reducing the rate of feed near depth; interrupting the feed to provide a dwell at depth; and separating said cutter and work piece.

16. The method of shaving a surface of revolution of a work piece with a rotary cutter having inclined blades, which comprises: line contacting said cutter and work piece simultaneously at substantial speeds; relating said speeds to provide a limited angle of cut; relatively feeding said cutter and work piece in plunge cutting relation; and reducing the rate of feed near depth.

17. The method of shaving a surface of revolution of a work piece with a rotary cutter having inclined blades, which comprises: line contacting said cutter and work piece simultaneously at substantial speeds; relating said speeds to provide an angle of cut of about 1°30'; relatively feeding said cutter and work piece in plunge cutting relation; reducing the rate of feed near depth; and interrupting feed at depth to provide a dwell.

18. The method of shaving a surface of revolution of a work piece with a rotary cutter having inclined blades, which comprises: line contacting said cutter and work piece simultaneously at substantial speeds; relating said speeds such that the angle of cut is less than 5°; relatively feeding said cutter and work piece in plunge cutting relation; and reducing the rate of feed near depth.

19. The method of cutting a work piece having surfaces of revolution which comprises providing a rotary cutting tool having successive cutting edges, engaging said tool in line contact with the surface of revolution of the work piece, so that said cutting edges are angularly related to said line of contact, rotating said tool and said work piece simultaneously but independently at speeds selected in accordance with the angular relationship between the cutting edges and the line of contact so that succeeding cutting edges take fine, narrow cuts for a distance at least several times greater than the width of cut, and feeding said tool toward said work in a direction which has a component parallel to the line of contact and a component perpendicular to the line of contact.

20. The method of cutting a work piece having a surface of revolution which comprises providing a rotary cutting tool having successive cutting edges, engaging the tool in line contact with the work, so that said cutting edges are angularly related to the line of contact, rotating said tool and work simultaneously and feeding said tool into the work to a predetermined depth, and decreasing the rate of feed near depth so as to provide a finishing action characterized by fine cuts.

21. The method of finishing a work piece having a surface of revolution which comprises rotating said work piece, positioning a beveled cutting tool having angularly disposed spaced cutting edges against said surface, said cutting edges being disposed so that each initiates cutting action at the small end of said beveled tool, rotating said cutting tool in line contact with said surface, so as to provide chip disposal toward the large end of said tool.

22. The method of finishing a work piece having a surface of revolution angularly disposed to the axis of said work piece, positioning a beveled cutting tool in line contact with said surface so that the small diameter end of said beveled tool cuts on said surface at a point further removed from the axis of said work piece than does the large diameter end, and rotating both said tool and said work piece at substantial speeds.

23. The method of cutting a work piece having a surface of revolution which comprises providing a rotary cutting tool having successive cutting edges, engaging the tool in line contact with the work, so that said cutting edges are angularly related to the line of contact, rotating said tool and work simultaneously and relatively feeding said tool and work so as to cause said tool to cut to a predetermined depth, and decreasing the rate of relative feed near depth so as to provide a finishing action characterized by fine cuts.

24. The method of cutting a work piece having a surface of revolution which comprises providing a rotary cutting tool having successive cutting edges, engaging the tool in line contact with the work, so that said cutting edges are angularly related to the line of contact, rotating said tool and work simultaneously and relatively feeding said tool and work so as to cause said tool to cut to a predetermined depth, decreasing the rate of feed near depth, arresting the feed at depth for at least a complete rotation of said work piece, and finally separating said tool and work piece.

25. The method of shaving a surface of revolution of a work piece with a rotary conical cutter having blades inclined at an angle of less than 30°, which comprises: line contacting said cutter and said surface; rotating said cutter and work piece simultaneously at substantial speeds; relating said speeds to provide a limited angle of cut; relatively feeding said cutter and work piece in plunge cutting relation at a rate designed to cause adjacent cuts to overlap substantially; reducing the rate of feed near depth; and interrupting said relative feed at depth.

ROBERT S. DRUMMOND.